United States Patent
Lewis

(10) Patent No.: US 6,991,016 B2
(45) Date of Patent: Jan. 31, 2006

(54) LOCKING VALVE STEM CAP SYSTEM, COMPONENTS THEREOF, AND ASSOCIATED METHODS

(75) Inventor: Myron C. Lewis, Auburn, WA (US)

(73) Assignee: UARA, Auburn, WA (US)

( * ) Notice: Subject to any disclaimer, the term of this patent is extended or adjusted under 35 U.S.C. 154(b) by 77 days.

(21) Appl. No.: 10/448,805

(22) Filed: May 30, 2003

(65) Prior Publication Data

US 2004/0237733 A1 Dec. 2, 2004

(51) Int. Cl.
*B60C 23/10* (2006.01)

(52) U.S. Cl. .................. 152/427; 411/429; 152/DIG. 13
(58) Field of Classification Search ................ 152/427, 152/428, 429, 431, DIG. 13; 411/429, 373, 411/432, 372, 393
See application file for complete search history.

(56) References Cited

U.S. PATENT DOCUMENTS

| | | | | |
|---|---|---|---|---|
| 2,493,665 A | * | 1/1950 | Gagnon | 15/431 |
| 2,812,000 A | * | 11/1957 | Trinca | 152/427 |
| 2,919,739 A | * | 1/1960 | Vocke | 152/431 |
| 2,943,665 A | * | 7/1960 | Cincel | 152/431 |
| 5,630,687 A | | 5/1997 | Robinson | |
| 6,062,787 A | | 5/2000 | Maddalena | |
| 6,279,600 B1 | * | 8/2001 | Robinson | 137/232 |

* cited by examiner

*Primary Examiner*—Frantz F. Jules
(74) *Attorney, Agent, or Firm*—TraskBritt, PC

(57) ABSTRACT

A locking valve stem cap system includes a sleeve, a valve stem cap, and a rotation tool. The sleeve is configured to threadingly engage a valve stem, with a portion of a threaded region of the valve stem protruding into a cap receptacle thereof. The valve stem cap is configured to be inserted into the cap receptacle of the sleeve and to threadingly engage the portion of the threaded region that is located within the cap receptacle. The rotation tool is configured to facilitate rotation of the valve stem cap when the outer periphery thereof is substantially surrounded by the sleeve, thereby facilitating tightening or loosening of the valve stem cap relative to the sleeve. Methods for installing and removing the valve stem cap system from a valve system are also disclosed.

26 Claims, 3 Drawing Sheets

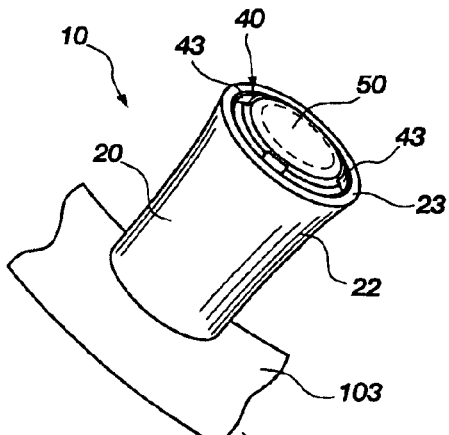
FIG. 3
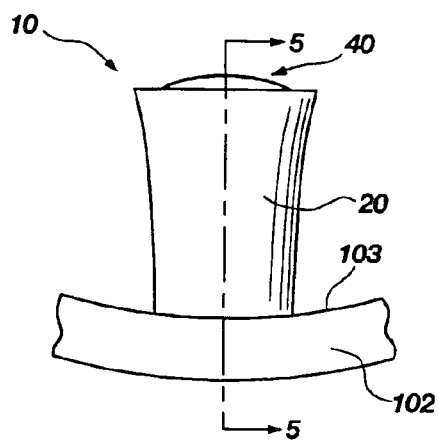
FIG. 4
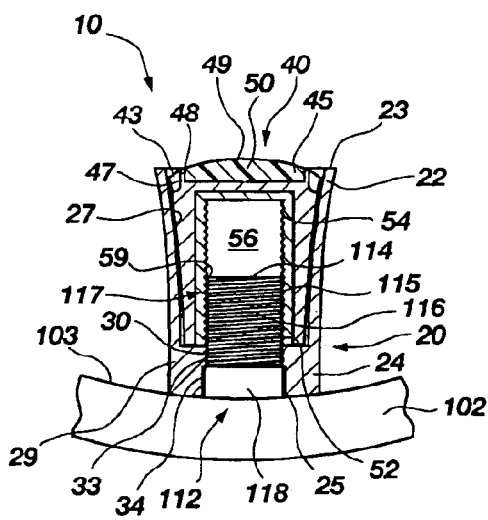
FIG. 5
FIG. 6
FIG. 7
FIG. 8
FIG. 9
FIG. 10

LOCKING VALVE STEM CAP SYSTEM, COMPONENTS THEREOF, AND ASSOCIATED METHODS

BACKGROUND OF THE INVENTION

1. Field of the Invention

The present invention relates generally to valve stem caps. More specifically, the present invention relates to valve stem caps that lock so as to prevent theft thereof. Additionally, the present invention relates to methods for installing and removing a valve stem cap from a valve stem.

2. Background of Related Art

Valve stems have long been used to facilitate the inflation and deflation of inner tubes, which are typically used in tires, as well as of so-called "tubeless" tires. Typically, a valve stem is a generally cylindrically shaped member that includes an external portion which protrudes from a wheel on which a tire has been installed and an internal portion that communicates with the interior of an inner tube or the tire. A valve, which controls the flow of air into and out of the valve stem and, thus, the inner tube or tire with which the valve stem communicates, is typically located at or near the exposed end of the external portion of the valve stem. In addition, a valve stem typically includes spiral threading on the exterior thereof, adjacent to the exposed end thereof. The threading of a valve stem facilitates the installation of a valve stem cap with complementary internal threading over the exposed portion of the valve to protect the valve and to further prevent air from escaping from the inner tube or tire.

Conventional valve stem caps are small, plastic or metal members that merely cover the end of a valve stem until access to the valve therein is desired. Often, such members include a series of longitudinally extending ridges thereon or other surface roughness features to facilitate the manual installation of the valve stem cap onto a valve stem, as well as its removal from the valve stem.

More aesthetically pleasing, or decorative, valve stem caps, which are also commonly referred to as "designer" valve stem caps, have been designed to improve the appearance of the valve stem, as well as that of the wheel from which the valve stem protrudes. Designer valve stem caps may have a shape or finish which matches that of the wheel adjacent to which they are to be used. Sometimes, designer valve stem caps include indicia, which may match other indicia on the vehicle (e.g., automobile, motorcycle, bicycle, etc.) or other apparatus with which they are used. Such features may increase the desirability of designer valve stem caps to others, which, combined with the conventional ease with which such caps may be removed, as well as with their high value relative to that of conventional valve stem caps, may result in theft thereof.

Consequently, locking, or tamper-resistant, valve stem caps have been developed. U.S. Pat. No. 5,630,687, issued to Robinson on May 20, 1997 (hereinafter "Robinson"), and U.S. Pat. No. 6,062,787, issued to Maddalena on May 16, 2000 (hereinafter "Maddalena") describe a couple of examples of tamper-resistant valve stem caps.

The tamper-resistant valve stem cap of Robinson includes an inner cap member, which is configured to be disposed over the end of a valve stem, and a decorative outer sleeve member, which is configured to be placed, by longitudinally sliding the same, over the inner cap member and secured thereto once the inner cap member is in place upon a valve stem. Robinson describes that a small set screw, which, when rotated, moves along a threaded aperture of the outer sleeve member, may be placed in a securing position, wherein an end of the set screw is inserted into a corresponding recess of the inner cap member, or a removal position, wherein the set screw is moved away from the inner cap member a sufficient distance to permit longitudinal sliding of the outer sleeve member relative to the inner cap member. The requirement of a tool to install the valve stem cap of Robinson on a valve stem is somewhat undesirable. Also, if the set screw does not stay in the proper position, the decorative portion of the Robinson valve stem cap may fall off of the inner cap member thereof and be lost. Moreover, due to the relatively small size of the set screw, handling thereof may be undesirably difficult if the set screw becomes filly removed form the threaded aperture of the outer sleeve member. Further, the base of the protruding portion of a valve stem remains exposed and, thus, prone to damage from the elements, bending, and flexing when a valve stem cap of the type described in Robinson is used thereon.

Maddalena also describes a valve stem which includes an outer sleeve member. The outer sleeve member of the valve stem cap of Maddalena is a hollow cylindrical member which is secured to the inner cap member thereof in such a way that the entire outer periphery of the inner cap member is surrounded by the outer sleeve member. Moreover, the outer sleeve member and the inner cap member of the tamper-resistant valve stem cap of Maddalena may be rotated independently of one another; rotation of the outer sleeve member will not result in rotation of the inner cap member. Accordingly, an upper surface of the inner cap member, which is exposed through the outer sleeve member, includes indents that are configured to be engaged by a key which corresponds to the valve stem cap. Thus, the valve stem cap may only be installed upon a valve stem by rotating the inner cap member with the key. Unfortunately, the inner cap member cannot be rotated manually. Therefore, the tamper-resistant valve stem cap of Maddalena cannot even be partially installed upon a valve stem or removed therefrom without the key. Further, like the tamper-resistant valve stem cap of Robinson, the valve stem cap of Maddalena is not configured to surround or protect the base of the protruding portion of a valve stem.

The inventor is not aware of a valve stem cap that substantially covers and protects a base of a protruding portion of a valve stem, or of a locking, or tamper-resistant, valve stem cap that may be installed upon a valve stem without requiring the use of a key or other tool.

SUMMARY OF THE INVENTION

The present invention includes a valve stem cap system and its various components. Without limitation, a valve stem cap system according to the present invention may include a valve stem cap, a sleeve configured to substantially surround the periphery of the valve stem cap, and a tool, or key, for securing the cap to a valve stem and for removing the cap from the valve stem.

A valve stem cap that incorporates teachings of the present invention is a somewhat elongate member that includes an upper end and a lower end, which is also referred to herein as a "valve stem engagement end." The valve stem engagement end of the valve stem cap includes a valve stem receptacle which is threaded complementarily to the threading on a valve stem to which the cap is to be secured.

The upper end of the valve stem cap may include indicia or be configured to receive an indicia-bearing element. Additionally, one or more indents or other rotation facilitation features may be positioned at the upper end of the valve stem cap to facilitate rotation thereof with a complementary tool, or key, without requiring an individual to grip any portion of the outer periphery of the valve stem cap.

The inventive valve stem cap may have a frustoconical shape, with the valve stem engagement end having a smaller peripheral dimension than the corresponding peripheral dimension of the upper end of the valve stem cap. Alternatively, the peripheral dimensions of the valve stem engagement end and of the upper end of a valve stem according to the present invention may be substantially the same. Accordingly, a valve stem cap according to the present invention may, by way of example only, have a generally cylindrical shape or a generally prismatic shape.

A sleeve according to the present invention includes an upper end with an opening that communicates with a cap receptacle which is configured to receive substantially the entire height of a complementarily configured valve stem cap. Accordingly, when a complementarily configured valve stem cap is completely disposed within the cap receptacle, virtually none of its outer periphery is exposed, thereby preventing an individual from grasping the same and, thus, from manually removing the valve stem cap from the cap receptacle. In addition, the cap receptacle is configured such that a valve stem cap therein may be rotated about its longitudinal axis.

A lower end of the sleeve includes a ledge which extends substantially perpendicular to a longitudinal axis of the sleeve. An aperture, which communicates with the cap receptacle of the sleeve, extends through the ledge. The aperture, which is circular in shape, has a diameter that is configured to receive a valve stem and includes threading that is complementary to the threading on a valve stem. The center of the aperture is positioned substantially on the longitudinal axis of the sleeve. Of course, the thickness of the ledge and, thus, the height of the aperture are somewhat less than the height of the complementarily threaded region of a valve stem cap to facilitate engagement of the valve stem cap by both the sleeve and a valve stem cap.

In addition to the ledge and aperture, the lower end of the sleeve may include a protective recess. The protective recess, located adjacent to the ledge on an opposite side thereof from the cap receptacle, has both a lateral dimension and a height which are configured to substantially receive a lower exposed portion, or base, of a protruding portion of a valve stem, which base is located between the external threading of the valve stem and the wheel from which the valve stem protrudes. As such, when the sleeve is installed on the valve stem, the base is substantially contained within the protective recess of the sleeve. In this manner, the base of the valve stem may be protected from exposure to the elements. Also, as a lower edge of the sleeve abuts or is positioned proximate to a surface of the wheel from which the valve stem protrudes, the sleeve may prevent bending or flexing of the base of the valve stem, which could otherwise result in undesirable wearing of the valve stem.

A valve stem cap system according to the present invention may also include a key or rotation tool. Without limiting the scope of the present invention, the key may include one or more prongs that are configured to be received by one or more corresponding indents or to engage one or more other rotation facilitation features (e.g., peripheral surface features accessible between the sleeve and the valve stem cap) located at or adjacent to the upper end of the valve stem cap. The key is configured such that, when each prong thereof is positioned within and, thus, engages a corresponding rotation facilitate feature of the valve stem cap, rotation of the key causes rotation of the valve stem cap. Thus, the key may be rotated to install the valve stem cap onto a valve stem, as well as to remove the valve stem cap from the valve stem.

The present invention also includes methods for securely installing a valve stem cap to a valve stem of a wheel-and-tire assembly. The inventive method includes positioning a sleeve according to the present invention over the valve stem, with the aperture at the lower end of the sleeve being positioned adjacent to and in substantial alignment with an exposed end of the valve stem. Thus, the longitudinal axis of the sleeve and a longitudinal axis of the valve stem are also in substantial alignment. The sleeve is then rotated (e.g., clockwise) about the longitudinal axis thereof such that the threading of the aperture thereof engages the threading of the valve stem. Such rotation may be effected until the sleeve will no longer rotate without an inordinate amount of force, for example, until the bottom of the aperture reaches the bottom of the threading on the valve stem, or until the lower edge of the sleeve abuts a portion of the surface of the wheel that surrounds the base of the protruding portion of the valve stem.

Next, the valve stem cap is inserted into the cap receptacle of the sleeve, which may substantially align a longitudinal axis of the valve stem cap with the longitudinal axis of the valve stem. The valve stem cap is then rotated about its longitudinal axis such that the threading within the valve stem receptacle thereof engages the complementary threading on the exterior of the exposed end of the valve stem. Such rotation may initially be effected manually or with an appropriately configured key or other rotation tool. When the outer periphery of the valve stem cap becomes substantially surrounded by the sleeve (i.e., the valve stem cap has been substantially inserted within the cap receptacle of the sleeve), continued rotation of the valve stem cap may be effected with the key or other rotation tool. Rotation of the valve stem cap continues until a lower edge of the valve stem cap is secured against an interior surface of the ledge of the sleeve.

When the sleeve and valve stem cap have both been secured to a valve stem, attempts to remove the sleeve (e.g., by rotating the same in a counterclockwise direction) will merely cause the interior surface of the ledge to abut the lower edge of the valve stem cap, locking the sleeve and valve stem cap into position relative to one another. Neither the sleeve nor the valve stem cap can then be removed until a key or other appropriate rotation tool is used to remove the valve stem cap from within the cap receptacle of the sleeve and, thus, from the valve stem. Of course, removal of the valve stem cap and sleeve from the valve stem may be effected by merely reversing the order of acts conducted during the installation process.

As the sleeve is not mechanically connected to the valve stem cap, the valve stem cap may be installed on a valve stem with or without the sleeve. Moreover, the sleeve and valve stem cap configurations of the present invention allow for valve stem cap designs which are aesthetically pleasing even when the sleeve is not used with the valve stem cap.

Other features and advantages of the present invention will become apparent to those of ordinary skill in the art through a consideration of the ensuing description, the accompanying drawings, and the appended claims.

BRIEF DESCRIPTION OF THE DRAWINGS

In the drawings, which depict exemplary features of various embodiments of the present invention:

FIG. 3 is a perspective view of the valve stem cap system on a valve stem of wheel-and-tire assembly;

FIG. 4 is a side view of the valve stem cap system of FIG. 3;

FIG. 5 is a cross-section taken along line 5—5 of FIG. 4;

FIG. 6 is a cross-sectional representation of engagement of rotation facilitation features that are accessible at or adjacent to the upper surface of a valve stem cap with corresponding prongs of a key configured for use with the valve stem cap; and FIGS. 7 through 10 are views of alternative configurations of valve stem caps and sleeves according to the present invention.

DETAILED DESCRIPTION

Figure 1:
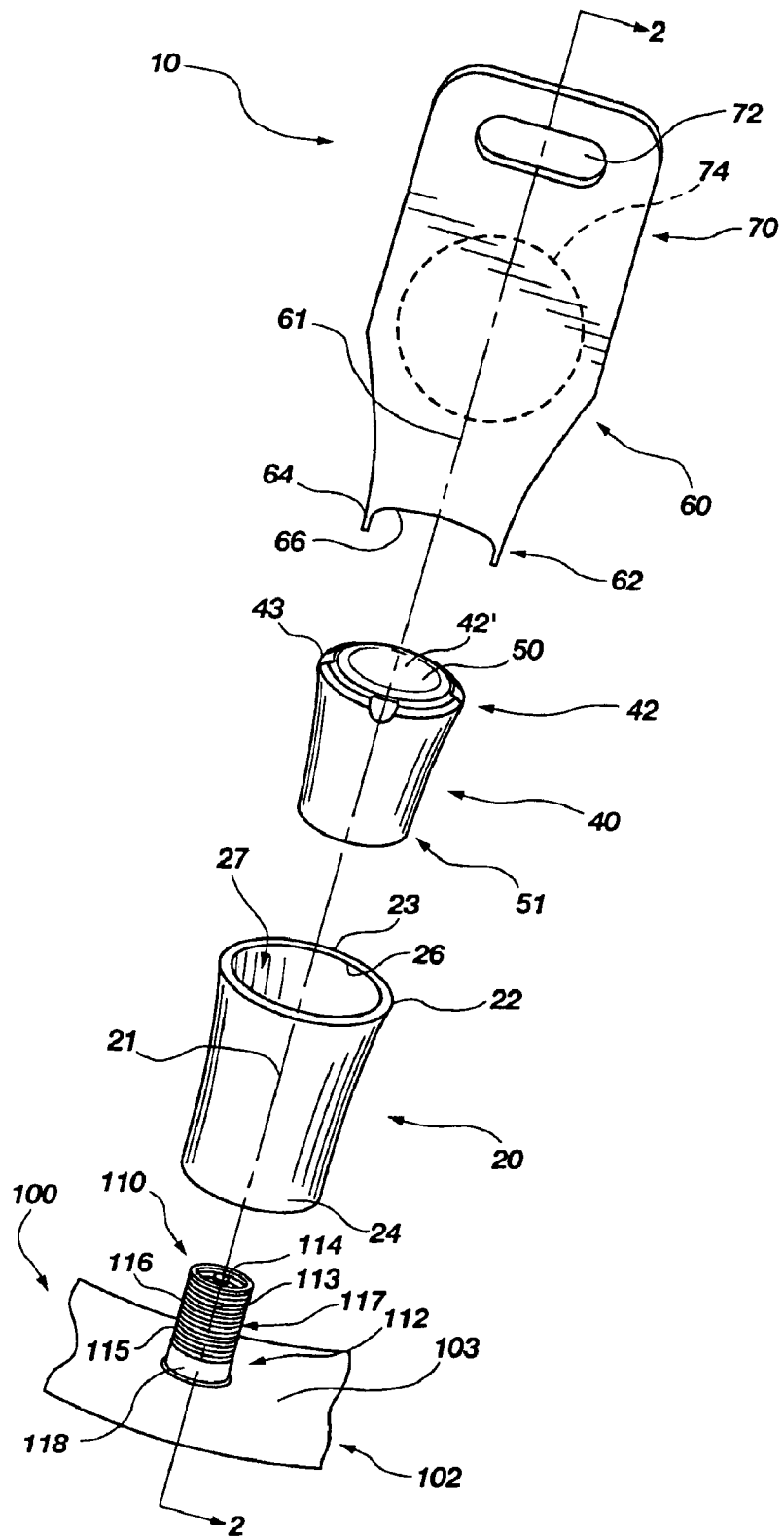
FIG. 1 is an exploded assembly view, in perspective, of an exemplary valve stem cap system according to the present invention and a valve stem upon which the sleeve and valve stem cap of the system are to be installed.

FIGS. 1 through 5 illustrate a valve stem cap system 10 according to the present invention. Valve stem cap system 10 includes a sleeve 20, a valve stem cap 40, and a rotation tool 60, or key. Both sleeve 20 and valve stem cap 40 are configured to threadingly engage a valve stem 110 of a wheel-and-tire assembly 100.

As shown, valve stem 110 protrudes from a surface 103 of a wheel 102 of wheel-and-tire assembly 100, which comprises an inflatable tire, such as that used with a variety of vehicles (e.g., automobiles, motorcycles, bicycles, etc.), as well as with numerous other types of apparatus. The portion of valve stem 110 shown in FIGS. 1 through 5 is an external portion, or protruding portion 112, thereof. As is well known in the art, air is introduced into or removed from a tube or tire (not shown) that communicates with valve stem 110 through an exposed, valve-retaining end 114 thereof. Valve-retaining end 114 includes threading 116, which typically has a universally accepted configuration (e.g., five-sixteenths inch (5/16") diameter—32 threads per inch) on the exterior 115 thereof. Threading 116 facilitates the installation and retention of a valve stem cap (e.g., valve stem cap 40) on valve-retaining end 114 of valve stem 110.

Sleeve 20 of valve stem cap system 10 is configured to be installed upon protruding portion 112 of valve stem 110 by threadingly engaging (i.e., screwing onto) valve-retaining end 114 thereof.

Sleeve 20 may be formed from a variety of materials, including plastics, steel, stainless steel, aluminum, brass, or the like. The material of sleeve 20 may remain exposed or be protectively coated with another material, such as a chrome plating.

As shown, sleeve 20 includes an outer wall 22 that forms the periphery thereof. An aperture 26, at an upper edge 23 of outer wall 22, opens to a cap receptacle 27, which is defined by all but a lower portion 24 of outer wall 22. As depicted, each cross-section of cap receptacle 27, taken transverse to a longitudinal axis 21 of sleeve 20, is substantially circular.

A ledge 29, which is located at or near a lower edge 25 of outer wall 22, forms a lower end 28 of cap receptacle 27 and extends inwardly from outer wall 22 substantially perpendicular to, or substantially radial from, longitudinal axis 21 of sleeve 20. Ledge 29 includes a substantially circular aperture 30 that extends completely therethrough and that includes a center 31 which is aligned with longitudinal axis 21 of sleeve 20. Aperture 30 also includes threading 33 on or in surface 32 thereof. Threading 33 is configured complementarily to (i.e., to engage) threading 116 of valve-retaining end 114 of valve stem 110. As such, sleeve 20 may be installed upon valve stem 110 by mutually engaging threading 33 and threading 116, such as by rotating sleeve 20 relative to valve stem 110, or screwing sleeve 20 onto valve stem 110. Nonetheless, ledge 29 has a thickness T which is less than the length L of a threaded region 117 of valve-retaining end 114 of valve stem 110, thereby facilitating the introduction of at least a portion of threaded region 117 into cap receptacle 27 as sleeve 20 is installed upon valve stem 110.

In addition, sleeve 20 may include a protective recess 34 that extends, within the confines of outer wall 22 thereof, between ledge 29 and lower edge 25. Protective recess 34, which opens to lower edge 25 and communicates with and is in substantial axial alignment with aperture 30, is configured to receive valve stem 110 and to substantially cover a base 118 of protruding portion 112 of valve stem 110 when sleeve 20 has been fully installed upon valve stem 110.

Valve stem cap 40, which is configured to be received by and rotate within, about a longitudinal axis 41 thereof, cap receptacle 27 of sleeve 20, is a somewhat elongate member that includes an upper section 42 and a lower section 51. This is even true if the valve stem cap (e.g., valve stem cap 40" of FIGS. 9 and 10) has a cross-section, taken transverse to the longitudinal axis (e.g., longitudinal axis 41") thereof, which is not substantially circular.

Like sleeve 20, valve stem cap 40 may be formed from a variety of materials, including plastics, steel, stainless steel, aluminum, brass, or the like. All or part of valve stem cap 40 may be coated with a protective material, such as a chrome plating.

Valve stem cap 40 may include a recess 45 formed in upper section 42 thereof. Recess 45 includes a base 46 and at least one peripheral wall 47.

Upper section 42 includes one or more indents 43 or other rotation facilitation features (e.g., gaps 43 between outer periphery 44 of valve stem cap 40 and an inner periphery 35 of sleeve 20, as shown in FIG. 10), which are configured to receive complementary features on a rotation tool 60. As depicted, upper section 42 of valve stem cap 40 includes four indents 43 positioned adjacent to and at various locations around the outer periphery 44 (e.g., the illustrated circumference) of upper section 42 at intervals of about ninety degrees (90°) around the circumference of outer periphery 44.

In the illustrated embodiment, indents 43 (see e.g., FIG. 2) are formed within an upper edge 48 of peripheral wall 47. Alternatively, a valve stem cap that incorporates teachings of the present invention may lack a recess 45 in upper section 42, in which case indents 43 may be formed in the surface of upper section 42.

Upper section 42 may also include indicia 49 thereon. As depicted, indicia 49 is carried by an indicia-bearing member 50 which is secured within recess 45 and substantially peripherally surrounded by peripheral wall 47. Alternatively, indicia 49 may be carried by or formed within a surface of upper section 42 of a valve stem cap according to the present invention.

Figure 2:
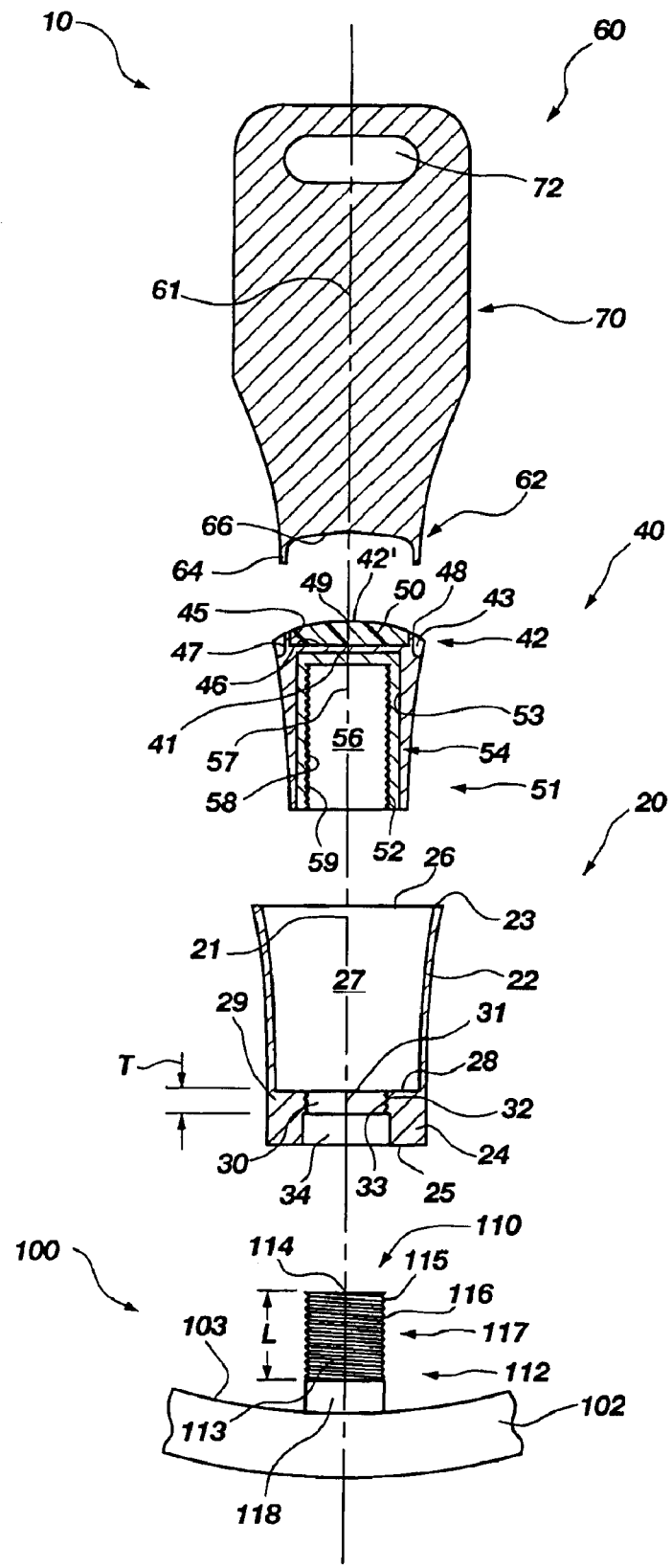
FIG. 2 is a cross-section taken along line 2—2 of FIG. 1.

Lower section 51 of valve stem cap 40 is configured to receive at least a portion of threaded region 117 of valve-retaining end 114 of valve stem 110. As shown in FIG. 2, lower section 51 may comprise a receptacle 53 within which a female threaded element 54 is contained and secured (e.g., by interference fit, with an adhesive material, etc.). Female threaded element 54, in turn, includes a valve stem receptacle 56 therein, which opens to a lower edge 52 of valve stem cap 40. A longitudinal axis 57 of valve stem receptacle 56 is substantially aligned with longitudinal axis 41 of valve stem cap 40. Valve stem receptacle 56 includes an interior surface 58 with threading 59 thereon. Like threading 33 within aperture 30 of sleeve 20, threading 59 is configured complementarily to threading 116 of valve-retaining end 114 of valve stem 110. Accordingly, upon rotating valve stem cap 40 along its longitudinal axis 41, which is in common with longitudinal axis 57 of valve stem receptacle 56, valve stem cap 40 may be installed upon and removed from a valve stem 110.

It is currently preferred that female threaded element 54 and threading 59 thereof be formed from a material (e.g., brass, stainless steel, plastic, etc.) that will not bind to the material from which threading 116 of valve-retaining end 114 of valve stem 110 is formed (typically steel or brass), as may otherwise occur when moisture is present between threading 59 and threading 116.

As an alternative to a valve stem cap 40 with a receptacle 53 that receives a female threaded element 54 with a valve stem receptacle 56 therein, a valve stem cap may have a valve stem receptacle formed directly therein without departing from the scope of the present invention.

As depicted, valve stem cap 40 has a generally frusto-conical (truncated conical) shape, with the lower section 51, or valve stem engagement end, thereof having smaller dimensions (e.g., diameter, circumference, etc.) than the corresponding dimensions of the upper section 42 of valve stem cap 40.

Alternatively, the peripheral dimensions of the valve stem engagement end and of the upper end of a valve stem according to the present invention may be substantially the same. Accordingly, a valve stem cap according to the present invention may, by way of example only and as shown in FIGS. 7 and 9, have a generally cylindrical shape (valve stem cap 40' of FIG. 7) or a generally prismatic shape (valve stem cap 40" of FIG. 9). FIGS. 8 and 10 respectively depict valve stem caps 40' and 40" in complementarily configured sleeves 20' and 20".

With returned reference to FIGS. 1 and 2, as well as to FIG. 6, rotation tool 60 includes a cap engagement end 62 and a handle 70. Cap engagement end 62 includes at least one key element 64 which is configured to engage a corresponding, complementarily configured feature, such as an indent 43, at upper section 42 of valve stem cap 40. As shown, cap engagement end 62 is substantially planar and includes two key elements 64, in the form of downwardly protruding prongs, at opposite sides thereof. In addition, cap engagement end 62 of rotation tool 60 includes a recessed area 66 between key elements 64 thereof. Recessed area 66 is configured to minimize or avoid contact with an upper surface 42 of valve stem cap 40, as well as with any indicia 49 thereon, when key elements 64 are inserted into their corresponding, oppositely positioned (i.e., at 180° in the depicted embodiment of valve stem cap 40) indents 43.

Handle 70, the depicted embodiment of which is also substantially planar and coplanar with cap engagement end 62 of rotation tool 60, is configured to be manually grasped by an individual, such as between the individual's thumb and index finger. Handle 70 may include an aperture 72, which may be configured to receive a key ring (not shown). Handle 70 may also include an indicia-carrying region 74, to which an indicia-bearing decal (not shown) may be secured or at which indicia may be printed, engraved, or otherwise formed.

As an example of the use of valve stem cap system 10, sleeve 20 may be installed upon a valve stem 110 by substantially aligning longitudinal axis 21 of sleeve 20 with a longitudinal axis 113 of protruding portion 112 of valve stem 110. Threaded region 117 of valve-retaining end 114 of valve stem 110 is inserted into aperture 30 of sleeve 20. Thereafter, sleeve 20 is rotated about longitudinal axis 21 thereof in a direction (e.g., clockwise) which will result in mutual engagement of threading 33 of aperture 30 and threading 116 of threaded region 117 of valve-retaining end 114 of valve stem 110. Such rotation may continue until threading 33 reaches a base 118 of protruding portion 112 or until lower edge 25 of sleeve 20 abuts surface 103 of wheel 102.

Next, valve stem cap 40 is positioned within cap receptacle 27 and longitudinal axis 41 of valve stem cap 40 and longitudinal axis 113 of protruding portion 112 of valve stem 110 are substantially aligned with one another. Upon introduction of threaded region 117 of valve-retaining end 114 within valve stem receptacle 56, valve stem cap 40 may be rotated (e.g., clockwise) such that threading 59 within valve stem receptacle 56 and threading 116 on valve-retaining end 114 of valve stem 110 mutually engage each other. Such rotation may be effected either manually or with rotation tool 60.

Once valve stem cap 40 is disposed substantially within cap receptacle 27 of sleeve 20, it may be locked in place by engaging indents 43 at upper surface 42' with corresponding key elements 64 of rotation tool 60, then, by gripping handle 70 and rotating rotation tool 60 about a centerline 61 thereof, until lower edge 52 of valve stem cap 40 abuts ledge 29 at the bottom of cap receptacle 27. As a result, sleeve 20 substantially surrounds the outer periphery of valve stem cap 40, thereby preventing manual rotation of valve stem cap 40 and, thus, locking valve stem cap 40 in place.

Alternatively, when valve stem cap 40 has been almost fully disposed within cap receptacle 27 of sleeve 20, sleeve 20 may be rotated in an opposite direction (e.g., counterclockwise) from the direction in which it was rotated to secure it to valve stem 110. Such opposite rotation is effected until lower edge 52 of valve stem cap 40 abuts ledge 29 at the bottom of cap receptacle 27, thereby locking valve stem cap 40 in place. Thus, valve stem cap system 10 may be secured in place while preventing tampering therewith, without the use of a key, rotation tool 60 or another tool.

While sleeve 20 and valve stem cap 40 are installed upon valve stem 110, the conventional benefits of valve stem caps are recognized, as are the protection that may be provided to base 118 of protruding portion 112 of valve stem 110 and the tamper-resistance and theft-deterrence provided by the complementary configurations of sleeve 20 and valve stem cap 40.

To remove valve stem cap 40, rotation tool 60 may be oriented such that each key element 64 thereof engages a corresponding indent 43 at upper surface 42 of valve stem cap 40. Rotation tool 60 may then be manually rotated, such as by gripping and rotating handle 70 thereof about centerline 61, in an opposite direction (e.g., counterclockwise) from that in which valve stem cap 40 was rotated to secure the same to valve stem 110. Such rotation may be effected until valve stem cap 40 has been removed from cap receptacle 27 of sleeve 20 enough to facilitate direct manual rotation of valve stem cap 40 or until threading 59 of valve stem receptacle 56 of valve stem cap 40 has completely disengaged threading 116 of valve-retaining end 114 of valve stem 110.

Sleeve 20 may then be removed from valve stem 110 by rotating sleeve 20 in a direction opposite (e.g., counterclockwise) from that in which sleeve 20 was rotated to install the same on valve stem 110. Such rotation may, by way of example only, be manually effected.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed:

1. A valve stem cap system, comprising:
    a sleeve, including:
        a cap receptacle;
        a ledge at a lower end of said cap receptacle; and
        an aperture formed through said ledge, in communication with said cap receptacle, and including threading configured complementarily to threading on an exterior of a valve stem, said ledge having a thickness which is less than a length of a threaded region of the valve stem;
    a valve stem cap configured to be disposed within said cap receptacle, having a height which is about the same as or less than a height of said cap receptacle, and substantially peripherally surroundable by said sleeve, said valve stem cap including:
        a lower end with a valve stem receptacle that includes threading configured complementarily to the threading on the exterior of the valve stem; and
        an upper end at or adjacent to which access to at least one rotation facilitation feature may be obtained; and
    a rotation tool including at least one key element corresponding to and configured to engage said at least one rotation facilitation feature so as to facilitate rotation of said valve stem cap.

2. The valve stem cap system of claim 1, wherein said cap receptacle is configured to permit rotation of said valve stem cap therein.

3. The valve stem cap system of claim 1, wherein at least a portion of the threaded region of the valve stem protrudes into said cap receptacle when said sleeve is installed upon the valve stem.

4. The valve stem cap system of claim 1, wherein said sleeve further includes a protective recess on an opposite side of said ledge from said cap receptacle, said protective recess communicating with said aperture and configured to substantially surround a base of a protruding portion of the valve stem when said sleeve is installed upon the valve stem.

5. The valve stem cap system of claim 1, wherein said valve stem cap further includes indicia on an upper surface thereof.

6. The valve stem cap system of claim 5, wherein said indicia is carried by said upper surface.

7. The valve stem cap system of claim 5, wherein said indicia is carried by a member retained within a recess formed in an upper section of said valve stem cap.

8. The valve stem cap system of claim 1, wherein said at least one rotation facilitation feature of said valve stem cap includes a plurality of indents located adjacent an outer periphery of said valve stem cap at an upper edge thereof.

9. The valve stem cap system of claim 8, wherein said plurality of indents comprises four indents spaced at 90° intervals around said outer periphery.

10. A sleeve configured for use in locking a valve stem cap into place on a valve stem, the sleeve comprising:
    a receptacle for the valve stem cap, having a height which is about the same as or greater than a height of the valve stem cap, and configured to facilitate rotation of the valve stem cap when the valve stem cap is disposed therein;
    a ledge at a lower end of said receptacle;
    an aperture formed through said ledge, in communication with said cap receptacle, and including threading configured complementarily to threading on an exterior of a valve stem, said aperture configured to engage the valve stem and to permit an end, including a portion of the threading thereon, to protrude into said receptacle; and
    a protective recess on an opposite side of said ledge from said receptacle, said protective recess communicating with said aperture and configured to substantially surround a base of a protruding portion of the valve stem when said sleeve is installed upon the valve stem.

11. The sleeve of claim 10, wherein said protective recess is configured to abut a surface of a wheel from which the valve stem protrudes.

12. The sleeve of claim 11, wherein said protective recess is configured to prevent bending or flexing of a protruding portion of the valve stem.

13. The sleeve of claim 11, wherein said protective recess is configured to reduce or eliminate exposure of the base of the protruding portion of the valve stem to the elements.

14. A method for installing and uninstalling a valve stem cap on a valve stem, comprising:
    installing a sleeve on a valve stem by threadingly engaging the valve stem, a threaded portion of the valve stem being exposed in a cap receptacle of said sleeve upon installation of said sleeve on the valve stem;
    introducing a valve stem cap into said cap receptacle;
    installing said valve stem cap on the valve stem by threadingly engaging the valve stem, a height of said valve stem cap being substantially peripherally surrounded by the sleeve to prevent an individual from grasping the valve stem cap; and
    engaging a lower edge of said valve stem cap against a base of said cap receptacle such that said valve stem cap will prevent manual removal of said sleeve and said valve stem cap from the valve stem.

15. The method of claim 14, wherein said engaging is effected by engaging at least one rotation facilitation feature at or adjacent to an upper end of said valve stem cap with a corresponding key feature of a rotation tool and rotating said rotation tool to rotate said valve stem cap.

16. The method of claim 14, wherein said engaging is effected by rotating said sleeve in an opposite direction from that in which said sleeve was rotated during said installing said sleeve.

17. The method of claim 14, further comprising:
    disengaging said lower edge of said valve stem cap and said base of said cap receptacle.

18. The method of claim 17, wherein said disengaging is effected by engaging at least one rotation facilitation feature with a corresponding key feature of a rotation tool and rotating said rotation tool to rotate said valve stem cap in an opposition direction from that in which said valve stem cap was rotated during said installing said valve stem cap.

19. A valve stem cap system, comprising:
- a sleeve, including:
  - a cap receptacle;
  - a ledge at a lower end of said cap receptacle;
  - an aperture formed through said ledge, in communication with said cap receptacle, and including threading configured complementarily to threading on an exterior of a valve stem, said ledge having a thickness which is less than a length of a threaded region of the valve stem; and
  - a protective recess on an opposite side of said ledge from said cap receptacle, said protective recess communicating with said aperture and configured to substantially surround a base of a protruding portion of the valve stem when said sleeve is installed upon the valve stem;
- a valve stem cap configured to be disposed within said cap receptacle and substantially peripherally surrounded thereby, said valve stem cap including:
  - a lower end with a valve stem receptacle that includes threading configured complementarily to the threading on the exterior of the valve stem; and
  - an upper end at or adjacent to which access to at least one rotation facilitation feature may be obtained; and
- a rotation tool including at least one key element corresponding to and configured to engage said at least one rotation facilitation feature so as to facilitate rotation of said valve stem cap.

20. A valve stem cap system, comprising:
- a sleeve, including:
  - a cap receptacle;
  - a ledge at a lower end of said cap receptacle; and
  - an aperture formed through said ledge, in communication with said cap receptacle, and including threading configured complementarily to threading on an exterior of a valve stem, said ledge having a thickness which is less than a length of a threaded region of the valve stem;
- a valve stem cap configured to be disposed within said cap receptacle and substantially peripherally surrounded thereby, said valve stem cap including:
  - a lower end with a valve stem receptacle that includes threading configured complementarily to the threading on the exterior of the valve stem;
  - an upper end at or adjacent to which access to at least one rotation facilitation feature may be obtained; and
  - at least one indicium at said upper end; and
- a rotation tool including at least one key element corresponding to and configured to engage said at least one rotation facilitation feature so as to facilitate rotation of said valve stem cap.

21. The valve stem cap system of claim 20, wherein said at least one indicium is carried by an upper surface of said valve stem cap.

22. The valve stem cap system of claim 20, wherein said at least one indicium is carried by a member retained within a recess formed in an upper section of said valve stem cap.

23. A valve stem cap system, comprising:
- a sleeve, including:
  - a cap receptacle;
  - a ledge at a lower end of said cap receptacle; and
  - an aperture formed through said ledge, in communication with said cap receptacle, and including threading configured complementarily to threading on an exterior of a valve stem, said ledge having a thickness which is less than a length of a threaded region of the valve stem;
- a valve stem cap configured to be disposed within said cap receptacle and substantially peripherally surrounded thereby, said valve stem cap including:
  - a lower end with a valve stem receptacle that includes threading configured complementarily to the threading on the exterior of the valve stem; and
  - an upper end at or adjacent to which access to a plurality of indents located adjacent an outer periphery of said valve stem cap at an upper edge thereof may be obtained; and
- a rotation tool including at least one key element corresponding to and configured to engage said at least one rotation facilitation feature so as to facilitate rotation of said valve stem cap.

24. The valve stem cap system of claim 23, wherein said plurality of indents comprises four indents spaced at 90° intervals around said outer periphery.

25. A valve stem cap system, comprising:
- a sleeve, including:
  - a cap receptacle;
  - a ledge at a lower end of said cap receptacle; and
  - an aperture formed through said ledge, in communication with said cap receptacle, and including threading configured complementarily to threading on an exterior of a valve stem, said ledge having a thickness which is less than a length of a threaded region of the valve stem; and
- a valve stem cap configured to be disposed within said cap receptacle and substantially peripherally surroundable by said sleeve, said valve stem cap including:
  - a lower end with a valve stem receptacle that includes threading configured complementarily to the threading on the exterior of the valve stem;
  - a bottom edge configured to abut an upper surface of said ledge when said sleeve and said valve stem cap are both threadingly installed on the valve stem and, when a bottom edge of said sleeve abuts a surface from which the valve stem protrudes, to lock against said upper surface of said ledge so as to prevent manual removal of said valve stem cap and said sleeve; and
  - an upper end at or adjacent to which access to at least one rotation facilitation feature may be obtained.

26. The valve stem cap system of claim 25, further comprising:
- a rotation tool including at least one key element corresponding to and configured to engage said at least one rotation facilitation feature so as to facilitate rotation of said valve stem cap.

* * * * *

UNITED STATES PATENT AND TRADEMARK OFFICE
CERTIFICATE OF CORRECTION

PATENT NO. : 6,991,016 B2  Page 1 of 1
APPLICATION NO. : 10/448805
DATED : January 31, 2006
INVENTOR(S) : Myron C. Lewis It is certified that error appears in the above-identified patent and that said Letters Patent is hereby corrected as shown below:

In the specification:
COLUMN 2, LINE 15, change "filly removed form" to --fully removed from--
COLUMN 6, LINE 39, after "gaps" change "43" to --43"--
COLUMN 6, LINE 40, after "periphery" change "44" to --44"-- and after "cap" change "40" to --40"--
COLUMN 6, LINE 41, after "sleeve" change "20" to --20"--
COLUMN 7, LINE 54, after "surface" change "42" to --42'--
COLUMN 8, LINE 56, after "surface" change "42" to --42'--

Signed and Sealed this

Sixth Day of November, 2007

JON W. DUDAS
*Director of the United States Patent and Trademark Office*